(12) United States Patent
Komatsu

(10) Patent No.: US 9,600,757 B2
(45) Date of Patent: Mar. 21, 2017

(54) IC CARD SUBSTRATE AND FITTED IC CARD

(71) Applicant: Kabushiki Kaisha Toshiba, Tokyo (JP)

(72) Inventor: Akira Komatsu, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/722,352

(22) Filed: May 27, 2015

(65) Prior Publication Data

US 2015/0347893 A1  Dec. 3, 2015

(30) Foreign Application Priority Data

May 27, 2014 (JP) ................................. 2014-109473

(51) Int. Cl.
*G06K 19/06* (2006.01)
*G06K 19/077* (2006.01)

(52) U.S. Cl.
CPC . *G06K 19/07739* (2013.01); *G06K 19/07732* (2013.01)

(58) Field of Classification Search
CPC ....... H01L 2924/00; H01L 2224/48227; H01L 2224/48091; H01L 2924/00014; G06K 19/07732; G06K 19/07739; G06K 7/0021; G06K 13/08; G06K 19/077; G06K 19/07743; G06K 19/07745; G06K 7/0047
USPC .......................... 235/492, 380, 488, 486, 487
See application file for complete search history.

(56) References Cited

U.S. PATENT DOCUMENTS

| 4,703,920 | A | * | 11/1987 | Grabbe | ................ | G01R 1/0425 269/115 |
| 4,810,616 | A | * | 3/1989 | Grabbe | ................ | H05K 13/021 269/115 |
| 4,864,116 | A | * | 9/1989 | Banjo | ................. | G06K 7/0047 235/441 |
| 5,456,018 | A | * | 10/1995 | Irlbeck | ................ | G01R 1/0433 33/613 |
| 5,920,126 | A | * | 7/1999 | Sohara | ................. | H01L 21/563 257/667 |
| 6,472,729 | B1 | * | 10/2002 | Oka | .................. | H01L 23/49503 257/618 |
| 6,554,193 | B1 | | 4/2003 | Fehrman et al. | | |
| 6,685,097 | B1 | | 2/2004 | Housse | | |

(Continued)

FOREIGN PATENT DOCUMENTS

| CA | 2329220 A1 | 10/1999 |
| JP | 2006-269376 A | 10/2006 |
| WO | 2013091353 A1 | 6/2013 |

OTHER PUBLICATIONS

Official Action issued in related Singapore Patent Appln. No. 10201504072Q, mailed Oct. 12, 2015 (8 pages).

(Continued)

*Primary Examiner* — Thien M Le
(74) *Attorney, Agent, or Firm* — Baker Botts L.L.P.

(57) ABSTRACT

An IC card substrate according to an embodiment is provided with a main body with a rectangular plate shape, a recessed portion which is provided on the main body, and in which an IC card having an IC chip and a contact pattern is to be fitted, and a groove portion which is provided on the main body and ranges from the recessed portion to a side of the main body.

11 Claims, 6 Drawing Sheets

(56) References Cited

U.S. PATENT DOCUMENTS

| | | | |
|---|---|---|---|
| 6,720,664 B1* | 4/2004 | Teng | H01L 24/97 257/618 |
| 7,097,512 B1* | 8/2006 | Hsiao | G06K 19/07739 439/630 |
| 2002/0050527 A1 | 5/2002 | Nishikawa et al. | |
| 2002/0053742 A1* | 5/2002 | Hata | H01L 25/167 257/774 |
| 2002/0101722 A1* | 8/2002 | Oguchi | G06K 7/0021 361/728 |
| 2004/0219810 A1* | 11/2004 | Nakai | G06K 7/0021 439/153 |
| 2005/0186711 A1* | 8/2005 | Yee | B29C 45/14418 438/123 |
| 2006/0067054 A1* | 3/2006 | Wang | H01L 23/3672 361/704 |
| 2007/0275601 A1* | 11/2007 | Takahashi | G06K 7/0021 439/607.01 |
| 2011/0003493 A1* | 1/2011 | Mo | H01R 27/00 439/81 |
| 2013/0116010 A1 | 5/2013 | Lepp et al. | |
| 2014/0225284 A1* | 8/2014 | Thacker | H01L 23/10 257/787 |

OTHER PUBLICATIONS

Extended European Search Report issued in related European Application No. 15169195.3, mailed on Nov. 2, 2015 (6 pages).
Office Action issued in related Korean Application No. 10-2015-0070273, mailed Aug. 30, 2016 (9 pages).

* cited by examiner

IC CARD SUBSTRATE AND FITTED IC CARD

CROSS-REFERENCE TO RELATED APPLICATION

This application is based upon and claims the benefit of priority from the prior Japanese Patent Application No. 2014-109473, filed on May 27, 2014, the entire contents of which are incorporated herein by reference.

FIELD

Embodiments of the present invention relate to an IC card substrate, and a fitted IC card.

BACKGROUND

Generally, an IC card used as a portable electronic device is provided with a card-like main body formed of plastic or the like, and an IC module embedded in the main body. The IC module has an IC chip and a contact pattern. The IC chip has a nonvolatile memory which can hold data in a state that a power source is not provided, and a CPU to execute various operations. The contact pattern is an interface for electrically connecting a contact terminal which a card reader/writer of a terminal device to process the IC card has, and the IC chip.

In addition, as an IC card, for example, there is a Subscriber Identity Module (SIM) card, or a User Identify Module (UIM) card or the like which is used by being inserted into a terminal device such as a portable telephone. For example, in "ETSI TS 102 221", shapes such as "Plug-in Universal Integrated Circuit Card (UICC)", "Mini-UICC", and "Fourth Form Factor (4FF)" are specified.

A shape of an IC card which can be inserted into a terminal device is determined by the specification of terminal device. For example, in order to insert an IC card with a shape different from the specification of terminal device into a terminal device, there is an adapter (an IC card substrate) for converting the relevant IC card into an IC card with another larger shape.

An IC card substrate as described above has a depression provided for fitting an IC card therein. But, when an IC card substrate is inserted into a terminal device in a state that an IC card is not fitted on the IC card substrate, there is a case in which a contact terminal that a card reader/writer of the terminal device has is caught in the depression of the IC card substrate, and thereby the IC card substrate cannot be taken out from the terminal device.

DETAILED DESCRIPTION

An IC card substrate according to an embodiment is provided with a main body with a rectangular plate shape, a recessed portion which is provided on the main body, and in which the IC card having an IC chip and a contact pattern is to be fitted, and a groove portion which is provided on the main body, and ranges from the recessed portion to a side of the main body.

Hereinafter, an IC card substrate, and a fitted IC card according to an embodiment will be described in detail with reference to the drawings.

Figure 1:
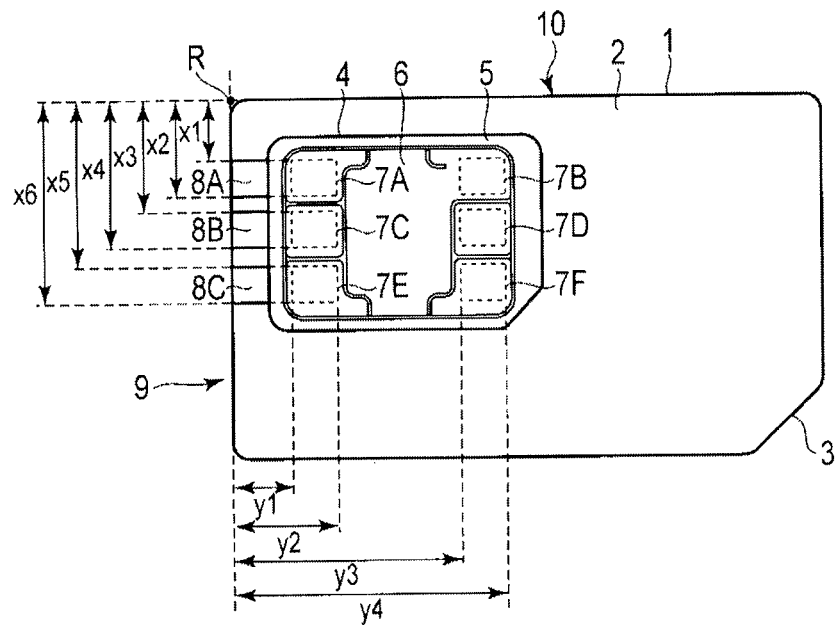
FIG. 1 is a view for explaining an example of a fitted IC card according to an embodiment.
Figure 2:
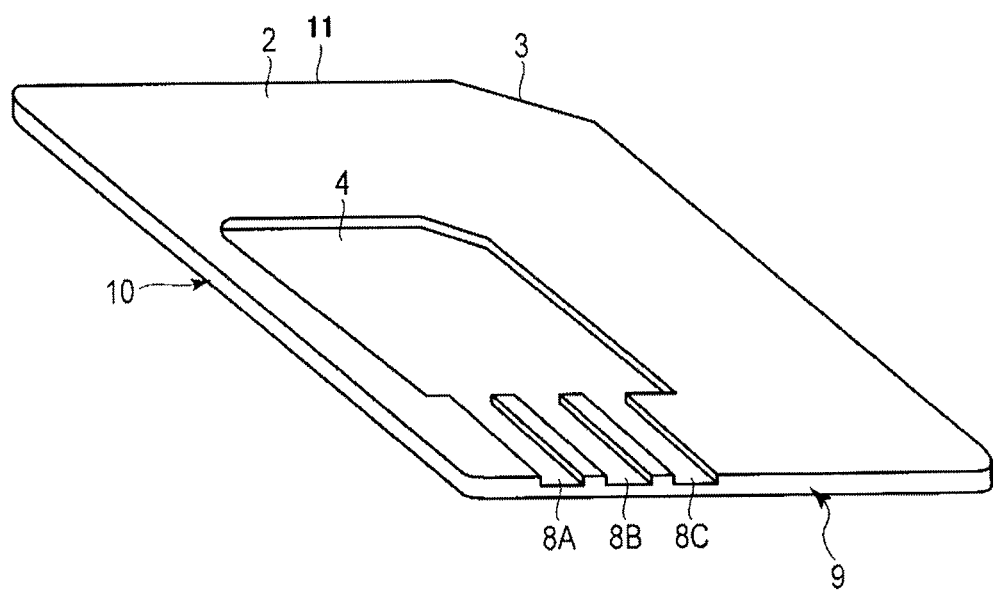
FIG. 2 is a view for explaining an example of the IC card substrate according to the embodiment.
Figure 3:
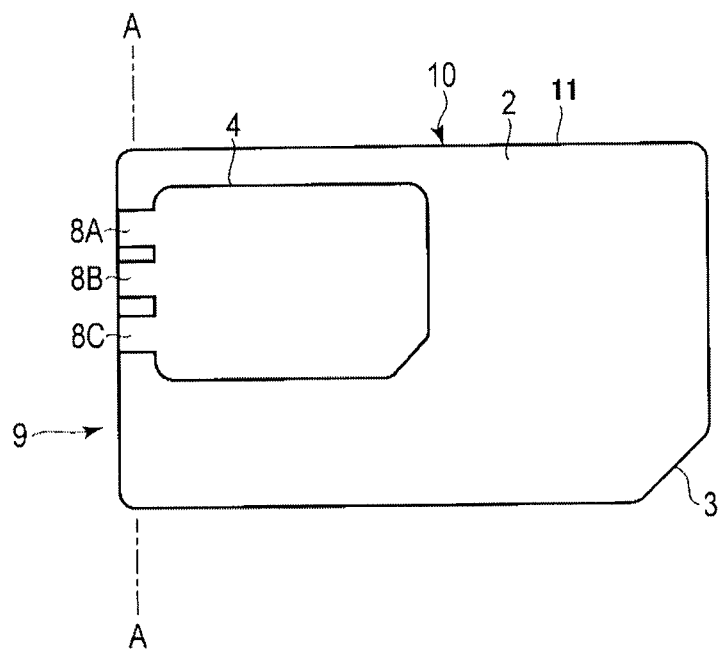
FIG. 3 is a view for explaining the example of the IC card substrate according to the embodiment.
Figure 4:
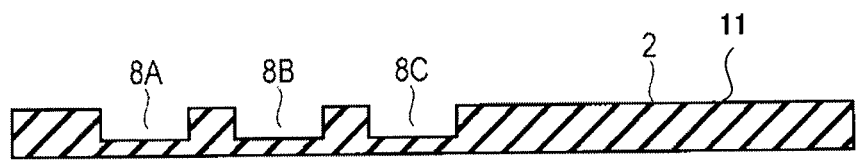
FIG. 4 is a view for explaining the example of the IC card substrate according to the embodiment.

FIG. 1 shows an example of a fitted IC card 1 according to an embodiment. In addition, FIG. 2 to FIG. 4 show an example of an IC card substrate 2. In addition, FIG. 2 is a perspective view showing an example of a configuration of the IC card substrate 2. FIG. 3 is a top view showing the example of the IC card substrate 2. FIG. 4 is a sectional view showing the IC card substrate 2 when it is cut along a line AA shown in FIG. 3.

As shown in FIG. 1, the fitted IC card 1 includes the IC card substrate 2 and an IC card 5, and the IC card 5 is fitted in the IC card substrate 2 to thereby manufacture the fitted IC card 1.

The IC card substrate 2 is a rectangular substrate formed of material such as plastic, for example. As shown in FIG. 2 and FIG. 3, the IC card substrate 2 is provided with a main body 11 with a rectangular plate shape, a cutout portion 3 for making a user identify a card inserting direction and so on, a recessed portion 4 in which the IC card 5 to be converted into a different shape is to be fitted, and groove portions 8A, 8B, 8C described later. That is, the cutout portion 3, the recessed portion 4, and the groove portions 8A, 8B, 8C are formed in the main body 11.

In addition, the IC card substrate 2 like this, is formed with a working method, such as injection molding of plastic material, for example. The cutout portion 3 is formed such that one corner of the rectangular IC card substrate 2 is cut deeper compared with the other corners. The IC card 5 is fitted in the recessed portion 4. The recessed portion 4 is formed in the main body 11 in a shape and size such that the IC card 5 fitted can be fixed therein without dropping therefrom. In addition, the recessed portion 4 may have a shape and size such that the IC card 5 is not fixed therein and can be put thereon movably within a prescribed allowable range.

The IC card 5 is manufactured in a state that an IC module including an IC chip (LSI) and a contact pattern 6 is fitted in a rectangular substrate formed of material such as plastic, for example. The IC chip is provided with a CPU, a ROM, a RAM, a nonvolatile memory, a power source section, a coprocessor, and a communication section, and so on.

The CPU is an operation element to perform various operations. The CPU performs various processings based on a control program and control data stored in the ROM or the nonvolatile memory. The ROM is a nonvolatile memory to previously store the control program and the control data and so on. The RAM is a volatile memory functioning as a working memory. The RAM temporarily stores data and so on which the CPU is processing. The nonvolatile memory is provided with a memory in which data can be written and rewritten, such as an EEPROM, for example. The nonvolatile memory stores the control program, the control data, an application, personal information, security information such as an encryption key, and data used in the application, and so on.

The contact pattern 6 is a contact terminal formed of conductive metal or the like, and composes a part of a surface of the IC card 5. That is, the contact pattern 6 is formed so that it can come in contact with a terminal device. The contact pattern 6 is formed such that a surface formed of the metal is partitioned into a plurality of cells. Each of the cells functions as a terminal of the IC card 5. That is, terminals of the IC chip in the IC card 5 can be electrically connected to a card reader/writer of the terminal device via the contact pattern 6.

A card reader/writer of a terminal device can communicate with the fitted IC card 1. The card reader/writer performs transmission/reception of data with the fitted IC card 1 by contact communication. That is, the card reader/writer can communicate with the IC card 5.

For example, a card reader/writer is provided with a slot into which the fitted IC card is loaded, and a plurality of contact terminals which are to be connected to the contact pattern 6 provided in the fitted IC card 1.

The plurality of contact terminals of the card reader/writer are provided so as to come in contact with the contact pattern 6 of the fitted IC card 1 when the fitted IC card 1 is loaded in the slot. By this means, the terminal device and the fitted IC card 1 are electrically connected. The card reader/writer performs supply of power, supply of a clock, input of a reset signal, and transmission/reception of data, and so on to the fitted IC card 1 to be loaded in the slot.

In addition, the shape of the fitted IC card 1 or the IC card substrate 2, and the position of the contact pattern 6 are specified in ETSI TS 102 221 as described above. In ETSI TS 102 221, positions of contact areas 7A, 7B, 7C, 7D, 7E, and 7F where the contact pattern 6 is to be provided, are specified, for each standard such as "Plug-in UICC", "Mini-UICC", or "4FF". When it is not necessary to discriminate the contact areas 7A, 7B, 7C, 7D, 7E, and 7F, these areas are referred to as contact areas 7. For example, positions of the contact areas 7 are specified by lengths from a reference point R of the fitted IC card 1. The contact pattern 6 of the fitted IC card 1 is provided so as to cover at least the contact areas 7.

In addition, the plurality of contact terminals of the card reader/writer are provided, so that they are positioned within the contact areas 7, respectively, when the fitted IC card 1 is inserted into the slot of the card reader/writer. In addition, the contact pattern 6 of the fitted IC card 1 is provided so that it is located in the contact areas 7, when the reference point of the fitted IC card 1 is inserted into the slot of the card reader/writer.

In addition, the groove portions 8 are provided in a range of the IC card substrate 2 which is supposed to come in contact with the plurality of contact terminals of the card reader/writer, when the fitted IC card 1 is inserted into the slot of the card reader/writer.

The reference point R is an intersection point of the two sides where the cutout portion 3 of the fitted IC card 1 is not provided. That is, the reference point R is an intersection point of an extension line of a short side 9 and an extension line of a long side 10 where the cutout portion 3 of the IC card substrate 2 is not provided.

For example, the IC card substrate 2 shown in FIG. 1 is an adapter for converting the IC card 5 based on "4FF" to a shape based on "Plug-in UICC". In this case, the IC card 5 based on "4FF" has a contact pattern formed with six cells. In the IC card substrate 2 to convert from "4FF" to "Plug-in UICC", the recessed portion 4 with a shape based on "4FF" is formed at a position where the position of the contact pattern 6 is based on "Plug-in UICC", when the IC card 5 is fitted in the IC card substrate 2.

The contact areas 7A, 7B, 7C, 7D, 7E, and 7F, and so on are specified in "Plug-in UICC". In "Plug-in UICC", it is specified that, in FIG. 1, a length of x1 is "2.75 mm", a length of x2 is "4.45 mm", a length of x3 is "5.29 mm", a length of x4 is "6.99 mm", a length of x5 is "7.83 mm", a length of x6 is "9.53 mm", a length of y1 is "4.00 mm", a length of y2 is "6.00 mm", a length of y3 is "11.62 mm", a length of y4 is "13.62 mm".

That is, the contact area 7A is provided at a position between "2.75 mm-4.45 mm" from the reference point R in the direction of the short side 9, and between "4.00 mm-6.00 mm" from the reference point R in the direction of the long side 10. The contact area 7B is provided at a position between "2.75 mm-4.45 mm" from the reference point R in the direction of the short side 9, and between "11.62 mm-13.62 mm" from the reference point R in the direction of the long side 10. The contact area 7C is provided at a position between "5.29 mm-6.99 mm" from the reference point R in the direction of the short side 9, and between "4.00 mm-6.00 mm" from the reference point R in the direction of the long side 10. The contact area 7D is provided at a position between "5.29 mm-6.99 mm" from the reference point R in the direction of the short side 9, and between "11.62 mm-13.62 mm" from the reference point R in the direction of the long side 10. The contact area 7E is provided at a position between "7.83 mm-9.53 mm" from the reference point R in the direction of the short side 9, and between "4.00 mm-6.00 mm" from the reference point R in the direction of the long side 10. The contact area 7F is provided at a position between "7.83 mm-9.53 mm" from the reference point R in the direction of the short side 9, and between "11.62 mm-13.62 mm" from the reference point R in the direction of the long side 10.

The groove portions 8, ranging from the recessed portion 4 to the short side or the long side of the IC card substrate 2, are provided. In addition, as described above, the groove portions 8 are provided in a range of the IC card substrate 2 where is supposed to come in contact with the plurality of contact terminals of the card reader/writer, when the fitted IC card 1 is inserted into the card reader/writer. That is, when the fitted IC card 1 is inserted in the direction of the long side with the cutout portion 3 being made as the back end, the groove portions 8 are provided on the IC card substrate 2 between the short side where the cutout portion 3 is not provided and the recessed portion 4.

In the example of FIG. 1, the IC card substrate 2 is provided with the groove portions 8A, 8B, and 8C. When it is not necessary to discriminate the groove portions 8A, 8B, and 8C, and so on, these groove portions are referred to as groove portions 8. The groove portion 8A is provided in a range between "2.75 mm-4.45 mm" from the reference point R in the direction of the short side 9. The groove portion 8B is provided in a range between "5.29 mm-6.99 mm" from the reference point R in the direction of the short side 9. The groove portion 8C is provided in a range between "7.83 mm-9.53 mm" from the reference point R in the direction of the short side 9.

FIG. 2 and FIG. 3 show the example of the IC card substrate 2 when the IC card 5 is not fitted therein. In addition, FIG. 4 is the sectional view of the IC card substrate 2 when it is cut along a line AA shown in FIG. 3.

As shown in FIG. 2 and FIG. 4, the IC card substrate 2 has the main body 11 with a rectangular plate shape formed of material such as plastic. In the main body 11, the cutout portion 3, the recessed portion 4, and the groove portions 8A, 8B, 8C which have been described in the explanation of the IC card substrate 2 are formed. The groove portions 8A, 8B, and 8C are respectively formed with the same depth as the recessed portion 4. When the groove portions 8A, 8B, and 8C are respectively formed with the same depth as the recessed portion 4 as in this manner, a portion on the IC card substrate 2 by which a contact terminal of a card reader/writer of a terminal device is caught does not exist. The main body 11 formed with the cutout portion 3, the recessed portion 4, and the groove portions 8A, 8B, 8C is formed with a working method such as injection molding of plastic material, for example, as described above.

In addition, the groove portions 8A, 8B, and 8C may be coupled with each other, to form a single groove. In addition, when the groove portions 8A, 8B, and 8C are formed as one groove, the groove portions 8A, 8B, and 8C may be formed by punching.

As described above, the IC card substrate 2 is provided with the groove portions 8 provided in an area which is supposed to come in contact with the contact terminals of the card reader/writer, when the IC card substrate 2 is inserted into the slot of the card reader/writer. That is, the groove portions 8 are formed in areas on the main body 11 corresponding to the tracks of the contact terminals. According to the configuration like this, even when the IC card substrate 2 is inserted into the slot of the terminal device in a state that the IC card 5 has not been fitted in the IC card substrate 2, there is not a wall of recess of the IC card substrate 2 with which the contact terminals provided in the card reader/writer of the terminal device come in contact. By this means, it is possible to easily take out the IC card substrate 2 from the slot. As a result of this, it is possible to provide an IC card substrate, and a fitted IC card, which have higher convenience.

Figure 5:
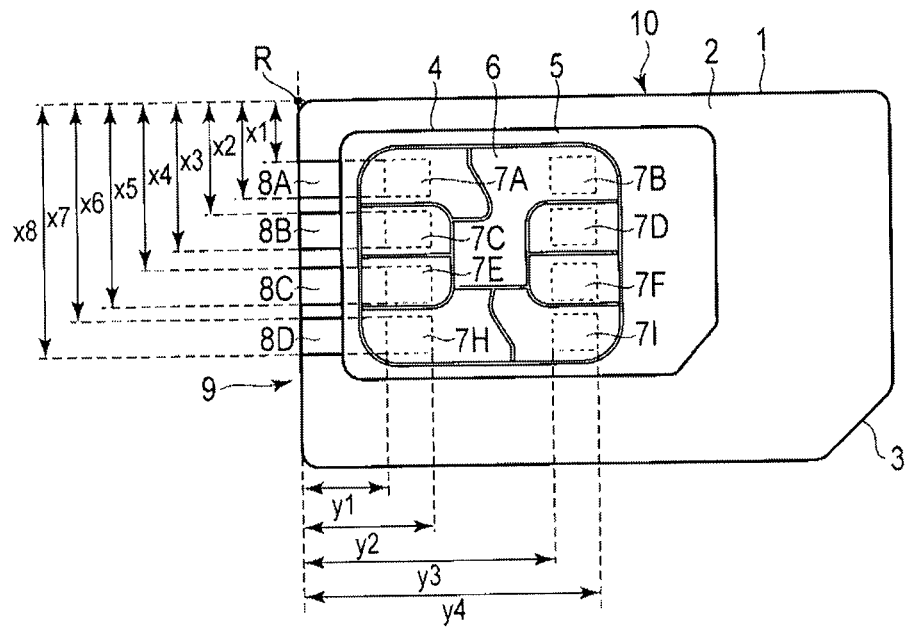
FIG. 5 is a view for explaining another example of a fitted IC card according to the embodiment.
Figure 6:
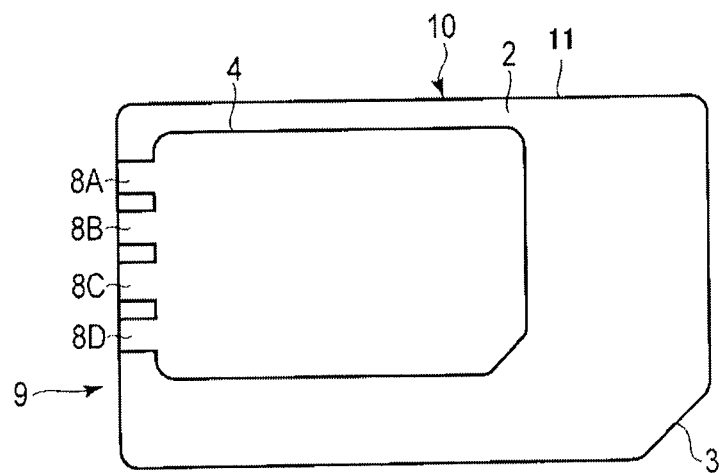
FIG. 6 is a view for explaining another example of the IC card substrate according to the embodiment.

FIG. 5 shows another example of the fitted IC card 1. In addition, FIG. 6 shows another example of the IC card substrate 2. The example of FIG. 5 and FIG. 6 is different from the example of FIG. 1 to FIG. 4, in the shape of the recessed portion 4, the shape of the IC card 5, the position of the contact pattern 6, the positions of the contact areas 7, and the positions of the grooves 8. For this reason, in the example of FIG. 5 and FIG. 6, the same reference symbols are given to the same respective portions as the example of FIG. 1 to FIG. 4, and portions different from the example of FIG. 1 to FIG. 4 will be described.

The IC card substrate 2 of the example of FIG. 5 and FIG. 6 is an adapter for converting the IC card 5 based on "mini-UICC" to a shape based on "Plug-in UICC". In this case, the IC card 5 based on "mini-UICC" has a contact pattern formed with eight cells. In the IC card substrate 2 to convert from "mini-UICC" to "Plug-in UICC", the recessed portion 4 with a shape based on "mini-UICC" is formed at a position where the position of the contact pattern 6 is based on "Plug-in UICC", when the IC card 5 is fitted in the IC card substrate 2.

The contact areas 7A, 7B, 7C, 7D, 7E, and 7F, and further contact areas 7H and 7I and so on are specified in "Plug-in UICC". In "Plug-in UICC", it is specified that, in FIG. 5, a length of x1 is "2.75 mm", a length of x2 is "4.45 mm", a length of x3 is "5.29 mm", a length of x4 is "6.99 mm", a length of x5 is "7.83 mm", a length of x6 is "9.53 mm", a length of x7 is "10.37 mm", a length of x8 is "12.07 mm", a length of y1 is "4.00 mm", a length of y2 is "6.00 mm", a length of y3 is "11.62 mm", a length of y4 is "13.62 mm".

That is, the contact area 7A is provided at a position between "2.75 mm-4.45 mm" from the reference point R in the direction of the short side 9, and between "4.00 mm-6.00 mm" from the reference point R in the direction of the long side 10. The contact area 7B is provided at a position between "2.75 mm-4.45 mm" from the reference point R in the direction of the short side 9, and between "11.62 mm-13.62 mm" from the reference point R in the direction of the long side 10. The contact area 7C is provided at a position between "5.29 mm-6.99 mm" from the reference point R in the direction of the short side 9, and between "4.00 mm-6.00 mm" from the reference point R in the direction of the long side 10. The contact area 7D is provided at a position between "5.29 mm-6.99 mm" from the reference point R in the direction of the short side 9, and between "11.62 mm-13.62 mm" from the reference point R in the direction of the long side 10. The contact area 7E is provided at a position between "7.83 mm-9.53 mm" from the reference point R in the direction of the short side 9, and between "4.00 mm-6.00 mm" from the reference point R in the direction of the long side 10. The contact area 7F is provided at a position between "7.83 mm-9.53 mm" from the reference point R in the direction of the short side 9, and between "11.62 mm-13.62 mm" from the reference point R in the direction of the long side 10. The contact area 7H is provided at a position between "10.37 mm-12.07 mm" from the reference point R in the direction of the short side 9, and between "4.00 mm-6.00 mm" from the reference point R in the direction of the long side 10. The contact area 7I is provided at a position between "10.37 mm-12.07 mm" from the reference point R in the direction of the short side 9, and between "11.62 mm-13.62 mm" from the reference point R in the direction of the long side 10.

The groove portions 8, ranging from the recessed portion 4 to the short side or the long side of the IC card substrate 2, are provided. In addition, as described above, the groove portions 8 are provided in a range of the IC card substrate 2 which is supposed to come in contact with the plurality of contact terminals of the card reader/writer when the fitted IC card 1 is inserted into the card reader/writer. That is, when the fitted IC card 1 is inserted in the direction of the long side with the cutout portion 3 being made as the back end, the groove portions 8 are provided on the IC card substrate 2 between the short side where the cutout portion 3 is not provided and the recessed portion 4.

In the example of FIG. 5 and FIG. 6, the IC card substrate 2 is provided with the groove portions 8A, 8B, 8C, and 8D. The groove portion 8A is provided in a range between "2.75 mm-4.45 mm" from the reference point R in the direction of the short side 9. The groove portion 8B is provided in a range between "5.29 mm-6.99 mm" from the reference point R in the direction of the short side 9. The groove portion 8C is provided in a range between "7.83 mm-9.53 mm" from the reference point R in the direction of the short side 9. The groove portion 8D is provided in a range between "10.37 mm-12.07 mm" from the reference point R in the direction of the short side 9.

In the same way as the example of FIG. 1 to FIG. 4, the IC card substrate 2 has the main body 11 with a rectangular plate shape formed of material such as plastic. In the main body 11, the cutout portion 3, and the recessed portion 4 and the groove portions 8 which have been described in the explanation of the IC card substrate 2 are formed. The groove portions 8A, 8B, 8C, and 8D are respectively formed with the same depth as the recessed portion 4. When the groove portions 8A, 8B, 8C, and 8D are respectively formed with the same depth as the recessed portion 4 as in this manner, a portion on the IC card substrate 2 by which a contact terminal of a card reader/writer of a terminal device is caught does not exist.

In addition, the groove portions 8A, 8B, 8C, and 8D may be coupled with each other, to form a single groove. In addition, when the groove portions 8A, 8B, 8C, and 8D are formed as one groove, the groove portions 8A, 8B, 8C, and 8D may be formed by punching.

According to the above-described configuration as well, the IC card substrate 2 is provided with the groove portions 8 provided in an area which is supposed to come in contact with contact terminals of the card reader/writer, when the IC card substrate 2 is inserted into the slot of the card reader/writer. That is, the groove portions 8 are formed in areas on the main body 11 corresponding to the tracks of the contact terminals. For this reason, there is not a wall of recess of the IC card substrate 2 with which the contact terminals provided in the card reader/writer of the terminal device come in contact, and thereby it is possible to easily take out the IC card substrate 2 from the slot. As a result of this, it is possible to provide an IC card substrate, and a fitted IC card, which have higher convenience.

Figure 7:
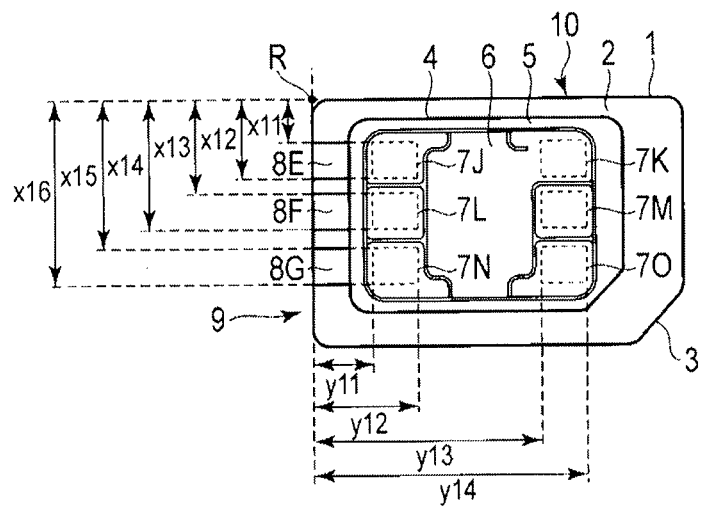
FIG. 7 is a view for explaining another example of a fitted IC card according to the embodiment.
Figure 8:
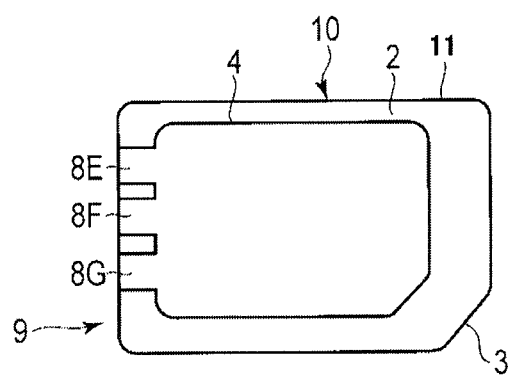
FIG. 8 is a view for explaining another example of the IC card substrate according to the embodiment.

FIG. 7 shows another example of the fitted IC card 1. In addition, FIG. 8 shows another example of the IC card substrate 2. The example of FIG. 7 and FIG. 8 is different from the examples of FIG. 1 to FIG. 4, and FIG. 5 and FIG. 6, in the shape of the IC card substrate 2, the shape of the main body 11, the shape of the recessed portion 4, the shape of the IC card 5, the position of the contact pattern 6, the positions of the contact areas 7, and the positions of the grooves 8. For this reason, in the example of FIG. 7 and FIG. 8, the same reference symbols are given to the same respective portions as the examples of FIG. 1 to FIG. 4, and FIG. 5 and FIG. 6, and portions different from the examples of FIG. 1 to FIG. 4, and FIG. 5 and FIG. 6 will be described.

The IC card substrate 2 of the example of FIG. 7 and FIG. 8 is an adapter for converting the IC card 5 based on "4FF" to a shape based on "mini-UICC". In this case, the IC card 5 based on "4FF" has a contact pattern formed with six cells. In the IC card substrate 2 to convert from "4FF" to "mini-UICC", the recessed portion 4 with a shape based on "4FF" is formed, at a position where the position of the contact pattern 6 is based on "mini-UICC", when the IC card 5 is fitted in the IC card substrate 2.

Contact areas 7J, 7K, 7L, 7M, 7N, and 7O and so on are specified in "mini-UICC". In "mini-UICC", it is specified that, in FIG. 7, a length of x11 is "1.34 mm", a length of x12 is "3.04 mm", a length of x13 is "3.88 mm", a length of x14 is "5.58 mm", a length of x15 is "6.42 mm", a length of x16 is "8.12 mm", a length of y11 is "2.15 mm", a length of y12 is "4.15 mm", a length of y13 is "9.77 mm", a length of y14 is "11.77 mm".

That is, the contact area 7J is provided at a position between "1.34 mm-3.04 mm" from the reference point R in the direction of the short side 9, and between "2.15 mm-4.15 mm" from the reference point R in the direction of the long side 10. The contact area 7K is provided at a position between "1.34 mm-3.04 mm" from the reference point R in the direction of the short side 9, and between "9.77 mm-11.77 mm" from the reference point R in the direction of the long side 10. The contact area 7L is provided at a position between "3.88 mm-5.58 mm" from the reference point R in the direction of the short side 9, and between "2.15 mm-4.15 mm" from the reference point R in the direction of the long side 10. The contact area 7M is provided at a position between "3.88 mm-5.58 mm" from the reference point R in the direction of the short side 9, and between "9.77 mm-11.77 mm" from the reference point R in the direction of the long side 10. The contact area 7N is provided at a position between "6.42 mm-8.12 mm" from the reference point R in the direction of the short side 9, and between "2.15 mm-4.15 mm" from the reference point R in the direction of the long side 10. The contact area 7O is provided at a position between "6.42 mm-8.12 mm" from the reference point R in the direction of the short side 9, and between "9.77 mm-11.77 mm" from the reference point R in the direction of the long side 10.

The groove portions 8, ranging from the recessed portion 4 to the short side or the long side of the IC card substrate 2, are provided. In addition, as described above, the groove portions 8 are provided in a range of the IC card substrate 2 which is supposed to come in contact with the plurality of contact terminals of the card reader/writer when the fitted IC card 1 is inserted into the card reader/writer. That is, when the fitted IC card 1 is inserted in the direction of the long side with the cutout portion 3 being made as the back end, the groove portions 8 are provided on the IC card substrate 2 between the short side where the cutout portion 3 is not provided and the recessed portion 4.

In the example of FIG. 7 and FIG. 8, the IC card substrate 2 is provided with groove portions 8E, 8F, and 8G. The groove portion 8E is provided in a range between "1.34 mm-3.04 mm" from the reference point R in the direction of the short side 9. The groove portion 8F is provided in a range between "3.88 mm-5.58 mm" from the reference point R in the direction of the short side 9. The groove portion 8G is provided in a range between "6.42 mm-8.12 mm" from the reference point R in the direction of the short side 9.

In the same way as the example of FIG. 1 to FIG. 4, the IC card substrate 2 has the main body 11 with a rectangular plate shape formed of material such as plastic. In the main body 11, the cutout portion 3, and the recessed portion 4, and the groove portions 8 which have been described in the explanation of the IC card substrate 2 are formed. The groove portions 8E, 8F, and 8G are respectively formed with the same depth as the recessed portion 4. When the groove portions 8E, 8F, and 8G are respectively formed with the same depth as the recessed portion 4 as in this manner, a portion on the IC card substrate 2 by which a contact terminal of a card reader/writer of a terminal device is caught does not exist.

In addition, the groove portions 8E, 8F, and 8G may be coupled with each other, to form a single groove. In addition, when the groove portions 8E, 8F, and 8G are formed as one groove, the groove portions 8E, 8F, and 8G may be formed by punching.

According to the above-described configuration as well, the IC card substrate 2 is provided with the groove portions 8 provided in an area which is supposed to come in contact with contact terminals of the card reader/writer, when the IC card substrate 2 is inserted into the slot of the card reader/writer. That is, the groove portions 8 are formed on areas of the main body 11 corresponding to the tracks of the contact terminals. For this reason, there is not a wall of recess of the IC card substrate 2 with which the contact terminals provided in the card reader/writer of the terminal device which come in contact, and thereby it is possible to easily take out the IC card substrate 2 from the slot. As a result of this, it is possible to provide an IC card substrate, and a fitted IC card, which have higher convenience.

In addition, in the above-described embodiment, the examples of the substrate 2 IC card when the fitted IC card 1 is inserted in the direction of the long side with the cutout portion 3 being made as the back end have been described. But, regarding an inserting direction of the fitted IC card 1, there is a case that the cutout portion 3 is made as the top, a case that the cutout portion 3 is made as the back end, a case that it is inserted in the direction of the long side, or a case that it is inserted in the direction of the short side, or the like.

Figure 9:
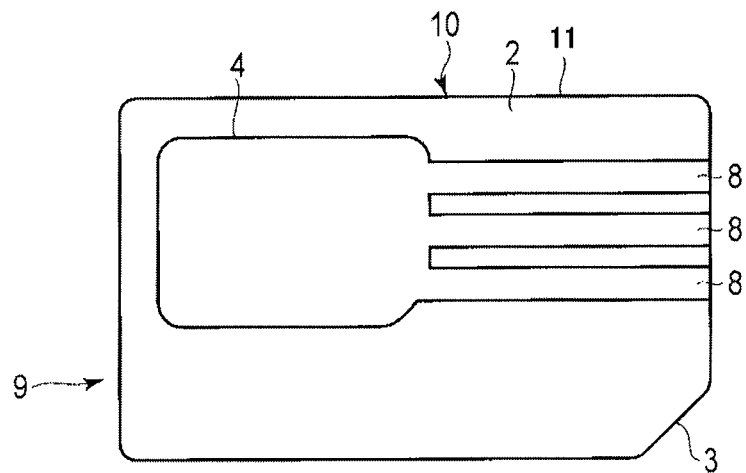
FIG. 9 is a view for explaining another example of an IC card substrate according to the embodiment.

For example, when the fitted IC card 1 is to be inserted in the direction of the long side with the cutout portion 3 being made as the top, the IC card substrate 2 is composed as shown in FIG. 9.

In the example of FIG. 9, the groove portions 8 ranging from the recessed portion 4 to the short side 9 of the IC card substrate 2 are provided. It is necessary that the groove portions 8 are provided in a range of the IC card substrate 2 which is supposed to come in contact with the plurality of contact terminals of the card reader/writer when the fitted IC card 1 is inserted into the card reader/writer. That is, the groove portions 8 are provided in the area of the main body 11 corresponding to this range of the IC card substrate 2. In this case, the groove portions 8 are provided on the IC card substrate 2 between the short side where the cutout portion 3 is provided and the recessed portion 4.

Figure 10:
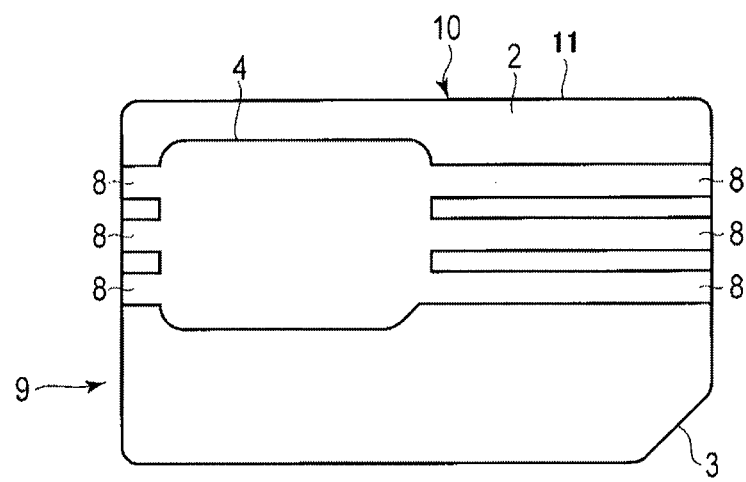
FIG. 10 is a view for explaining another example of an IC card substrate according to the embodiment.

In addition, for example, when it is unclear whether the fitted IC card 1 is inserted in the long side direction with the cutout portion 3 being made as the top, or is inserted in the long side direction with the cutout portion 3 being made as the back end, the IC card substrate 2 is composed as shown in FIG. 10.

In the example of FIG. 10, the groove portions 8 ranging from the recessed portion 4 to the respective) both short sides 9 of the IC card substrate 2 are provided. That is, the groove portions 8 are provided on the IC card substrate 2 between the short side 9 where the cutout portion 3 is provided and the recessed portion 4, and on the IC card substrate 2 between the short side 9 where the cutout portion 3 is not provided and the recessed portion 4.

Figure 11:
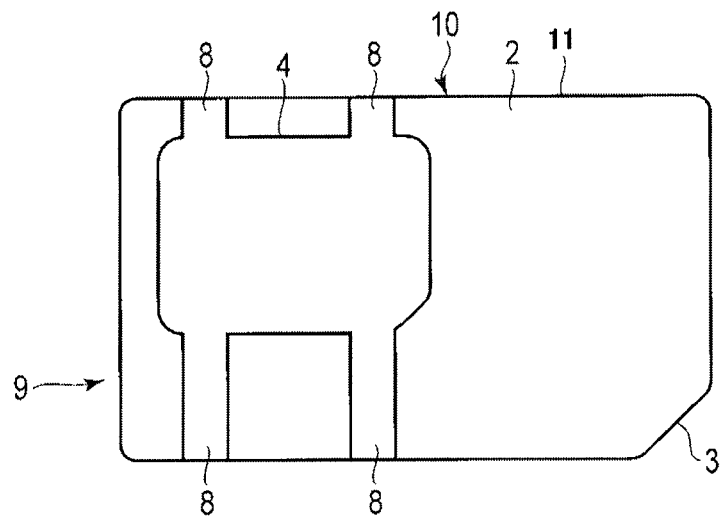
FIG. 11 is a view for explaining another example of an IC card substrate according to the embodiment.

In addition, for example, when it is unclear whether the fitted card 1 is inserted in the short side direction with the cutout portion 3 being made as the top, or is inserted in the short side direction with the cutout portion 3 being made as the back end, the IC card substrate 2 is composed as shown in FIG. 11.

In the example of FIG. 11, the groove portions 8 ranging from the recessed portion 4 to the respective both long sides 10 of the IC card substrate 2 are provided. That is, the groove portions 8 are provided on the IC card substrate 2 between the long side 10 where the cutout portion 3 is provided and the recessed portion 4, and on the IC card substrate 2 between the long side 10 where the cutout portion 3 is not provided and the recessed portion 4.

Figure 12:
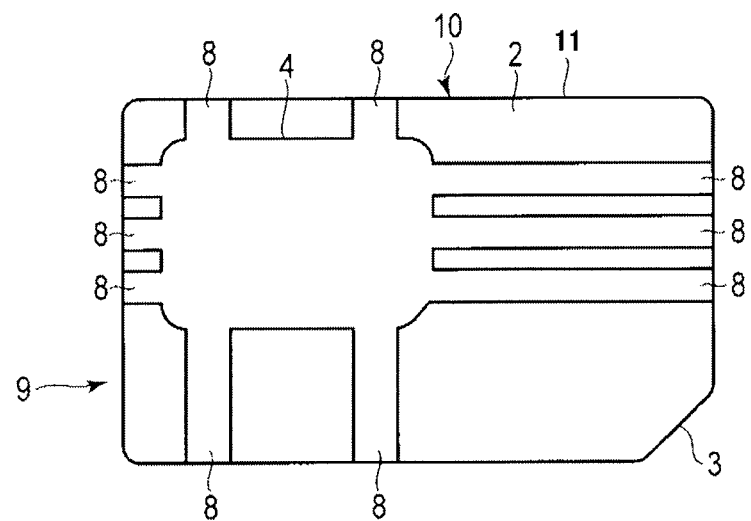
FIG. 12 is a view for explaining another example of an IC card substrate according to the embodiment.

In addition, further, when it is unclear whether the fitted IC card 1 is inserted with the cutout portion 3 being made as the top or is inserted with the cutout portion 3 being made as the back end, and when it is unclear whether the fitted card 1 is inserted in the short side direction or is inserted in the long side direction, the IC card substrate 2 is composed as shown in FIG. 12.

In the example of FIG. 12, the groove portions 8 ranging from the recessed portion 4 to the respective both short sides 9 of the IC card substrate 2 are provided. That is, the groove portions 8 are provided on the IC card substrate 2 between the short side 9 where the cutout portion 3 is provided and the recessed portion 4, and on the IC card substrate 2 between the short side 9 where the cutout portion 3 is not provided and the recessed portion 4. Further, the groove portions 8 ranging from the recessed portion 4 to the respective both long sides 10 of the IC card substrate 2 are provided. That is, the groove portions 8 are provided on the IC card substrate 2 between the long side 10 where the cutout portion 3 is provided and the recessed portion 4, and on the IC card substrate 2 between the long side 10 where the cutout portion 3 is not provided and the recessed portion 4.

As described above, the groove portions 8 are arranged in accordance with the inserting direction of the fitted IC card 1. Further, when the groove portions 8 ranging from the recessed portion 4 to the respective both long sides 10 of the IC card substrate 2, or the groove portions 8 ranging from the recessed portion 4 to the respective both short sides 9 thereof are provided, whatever direction the inserting direction of the fitted IC card 2 may be, it is possible to easily take out the IC card substrate 2 from the slot without the contact terminals provided in the card reader/writer of the terminal device coming in contact with the IC card substrate 2. As a result of this, it is possible to provide an IC card substrate, and a fitted IC card, which have higher convenience.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC card substrate, comprising:
   a main body with a rectangular plate shape having a pair of rectangular short sides of predetermined length and a pair of rectangular long sides of length longer than the predetermined length;
   a recessed portion which is provided on the main body, and in which an IC card having an IC chip and a contact pattern is to be fitted detachably; and
   a groove portion which is provided on the main body, and which ranges from the recessed portion to a rectangular side of the main body, wherein the groove portion is in parallel to one of the rectangular short side and the rectangular long side and wherein a depth of the groove portion is equal to a depth of the recessed portion,
   wherein the IC card substrate is an adapter for converting a shape of the IC card into another shape larger than the shape of the IC card.

2. The IC card substrate according to claim 1, wherein the groove portion is provided at an area corresponding to a track of a contact terminal, when the IC card substrate is inserted into a slot of a card reader/writer having the contact terminal configured to come in contact with the contact pattern in the slot.

3. The IC card substrate according to claim 1 or claim 2, wherein the IC card substrate has a plurality of groove portions as the groove portion.

4. The IC card substrate according to claim 1 or claim 2, wherein the main body has a cutout portion provided at one rectangular corner thereof; and the groove portion ranges from the rectangular short side where the cutout portion is not provided to the recessed portion.

5. The IC card substrate according to claim 1 or claim 2, wherein the main body has a cutout portion provided at one rectangular corner thereof; and the groove portion ranges from the rectangular short side where the cutout portion is provided to the recessed portion.

6. The IC card substrate according to claim 1 or claim 2, wherein the groove portions range from respective both the rectangular short sides to the recessed portion.

7. The IC card substrate according to claim 1 or claim 2, wherein the main body has a cutout portion provided at one rectangular corner thereof; and the groove portion ranges from the rectangular long side where the cutout portion is not provided to the recessed portion.

8. The IC card substrate according to claim 1 or claim 2, wherein the main body has a cutout portion provided at one rectangular corner thereof; and the groove portion ranges from the rectangular long side where the cutout portion is provided to the recessed portion.

9. The IC card substrate according to claim 1 or claim 2, wherein the groove portions range from respective both the rectangular long sides to the recessed portion.

10. The IC card substrate according to claim 1 or claim 2, wherein the groove portions includes groove portions ranging from respective both the rectangular long sides to the recessed portion, and groove portions ranging from respective both the rectangular short sides to the recessed portion.

11. A fitted IC card, comprising:
an IC card substrate including a main body with a rectangular plate shape having a pair of rectangular short sides of predetermined length and a pair of rectangular long sides of length longer than the predetermined length, a recessed portion which is provided on the main body and in which an IC card is to be fitted detachably, and a groove portion which is provided on the main body and which ranges from the recessed portion to a side of the main body, wherein the groove portion is in parallel to one of the rectangular short side and the rectangular long side and wherein a depth of the groove portion is equal to a depth of the recessed portion; and
an IC card having an IC chip and a contact pattern which is fitted in the recessed portion;
wherein the IC card substrate is an adapter for converting a shape of the IC card into another shape larger than the shape of the IC card.

* * * * *